US009418102B2

(12) United States Patent
Inoue et al.

(10) Patent No.: US 9,418,102 B2
(45) Date of Patent: Aug. 16, 2016

(54) INFORMATION PROCESSING DEVICE, INFORMATION PROCESSING METHOD, INFORMATION PROCESSING DEVICE PROGRAM, AND RECORDING MEDIUM

(75) Inventors: Teiko Inoue, Shinagawa-ku (JP); Taku Yasui, Shinagawa-ku (JP); Kenji Sugiki, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 427 days.

(21) Appl. No.: 13/814,613

(22) PCT Filed: Aug. 10, 2012

(86) PCT No.: PCT/JP2012/070442
§ 371 (c)(1),
(2), (4) Date: Feb. 6, 2013

(87) PCT Pub. No.: WO2013/077039
PCT Pub. Date: May 30, 2013

(65) Prior Publication Data
US 2013/0173619 A1    Jul. 4, 2013

(30) Foreign Application Priority Data
Nov. 24, 2011    (JP) .................................. 2011-256055

(51) Int. Cl.
*G06F 17/30*    (2006.01)

(52) U.S. Cl.
CPC .... *G06F 17/30389* (2013.01); *G06F 17/30424* (2013.01); *G06F 17/30737* (2013.01)

(58) Field of Classification Search
CPC ................................................ G06F 17/30424
USPC ......................................................... 707/736
See application file for complete search history.

(56) References Cited

U.S. PATENT DOCUMENTS

| 4,736,296 A | * | 4/1988 | Katayama | ............... G06F 3/018 434/157 |
| 5,675,819 A | * | 10/1997 | Schuetze | ........... G06F 17/30675 704/10 |

(Continued)

FOREIGN PATENT DOCUMENTS

| JP | 2005-141449 A | 6/2005 |
| JP | 2005-250762 A | 9/2005 |

(Continued)

OTHER PUBLICATIONS

Noriaki Kawamae et al., "User Support by Keyword Presentation Based on User Search Behavior", Human Interface Society, 2004, vol. 4, No. 1, pp. 75-80.

(Continued)

*Primary Examiner* — Thu-Nguyet Le
*Assistant Examiner* — Nargis Sultana
(74) *Attorney, Agent, or Firm* — Sughrue Mion, PLLC

(57) ABSTRACT

A pair search word, which is obtained by forming a pair of a preceding search word and a subsequent search word in the search times, is generated in accordance with an order of the search times, from search words in which intervals between the search times associated with the identical user specifying information are within a predetermined time, with reference to a search word memory means which stores the search words. A first appearance count of a pair search word among generated pair search words is calculated, a second appearance count of a reverse order pair search word obtained by reversing an order of a search time of the specific pair search word is calculated, and, when a magnitude relationship between the first appearance count and the second appearance account satisfies predetermined conditions, the preceding search word and the subsequent search word are stored as a thesaurus.

12 Claims, 13 Drawing Sheets

(56) References Cited

U.S. PATENT DOCUMENTS

| | | | | |
|---|---|---|---|---|
| 5,987,460 A * | 11/1999 | Niwa | | G06F 17/30696 |
| 6,006,225 A * | 12/1999 | Bowman | | G06F 17/30395 |
| 6,401,084 B1 * | 6/2002 | Ortega et al. | | 707/706 |
| 6,691,103 B1 * | 2/2004 | Wozny | | G06F 17/30424 |
| 7,552,112 B2 | 6/2009 | Jhala et al. | | |
| 8,041,189 B2 * | 10/2011 | Shinkai et al. | | 386/281 |
| 8,147,250 B2 * | 4/2012 | Deane | | 434/169 |
| 8,171,029 B2 * | 5/2012 | Marvit | | G06F 17/2735 704/1 |
| 8,290,975 B2 * | 10/2012 | Gao | | G06F 17/3064 707/705 |
| 8,489,574 B2 * | 7/2013 | Epstein | | G06F 17/30864 707/706 |
| 2003/0220922 A1 * | 11/2003 | Yamamoto | | G06F 17/30705 |
| 2004/0111678 A1 * | 6/2004 | Hara | | G06F 17/30737 715/273 |
| 2008/0071740 A1 * | 3/2008 | Jhala | | G06F 17/3064 |
| 2008/0077398 A1 * | 3/2008 | Tsunokawa | | G06F 17/30731 704/10 |
| 2008/0082477 A1 * | 4/2008 | Dominowska | | G06F 17/30616 |
| 2008/0183463 A1 * | 7/2008 | Deane | | G06F 17/277 704/9 |
| 2008/0288489 A1 * | 11/2008 | Kim | | G06F 17/30675 |
| 2009/0024591 A1 * | 1/2009 | Miyasaka | | G06F 17/30244 |
| 2009/0044105 A1 * | 2/2009 | Matsukawa | | G06F 17/2735 715/256 |
| 2009/0259850 A1 * | 10/2009 | Ishibashi | | H04L 9/3273 713/169 |
| 2010/0057724 A1 * | 3/2010 | Matsumura | | G06F 17/30731 707/E17.017 |
| 2010/0169316 A1 * | 7/2010 | Gehlot | | G06Q 30/00 707/736 |
| 2010/0228729 A1 * | 9/2010 | Asonov | | 707/730 |
| 2011/0029559 A1 * | 2/2011 | Kikuchi | | G06F 17/30864 707/770 |
| 2011/0066624 A1 * | 3/2011 | Turakhia | | G06F 17/30864 707/748 |
| 2011/0078130 A1 * | 3/2011 | Roizen | | G06F 17/30687 707/706 |
| 2011/0313773 A1 * | 12/2011 | Yamada | | G10L 17/26 704/270 |
| 2012/0254802 A1 * | 10/2012 | Tinkler | | G06F 17/2735 715/830 |
| 2013/0085854 A1 * | 4/2013 | Masuko | | G06Q 30/0601 705/14.53 |
| 2013/0103493 A1 * | 4/2013 | Gao et al. | | 705/14.46 |

FOREIGN PATENT DOCUMENTS

| | | |
|---|---|---|
| JP | 2005-316699 A | 11/2005 |
| JP | 2009-003515 A | 1/2009 |

OTHER PUBLICATIONS

International Search Report of PCT/JP2012/070442, dated Sep. 4, 2012.

* cited by examiner

| PAIR SEARCH WORD | |
|---|---|
| PRECEDING SEARCH WORD | SUBSEQUENT SEARCH WORD |
| TV | television |
| TV | television 32inch |
| TV | television 32inch black |
| television | television 32inch |
| television | television 32inch black |
| television 32inch | television 32inch black |
| motorcycle | motorbike |
| television | TV |
| ... | ... |

FIG.9

| TV | television | |
|---|---|---|
| motorbike | motorcycle | |
| computer | PC | personal computer |

| heavy-metal rock | heavy metal | heavy-metal |
|---|---|---|
| hit-and-run | and-run | |
| Mt. Fuji | △Fuji | |
| Fu☆ji | Fu・ji | |

FIG.10

| | | |
|---|---|---|
| TV | television | |
| motorbike | motorcycle | |
| computer | PC | personal computer |

| | | |
|---|---|---|
| heavy-metal rock | heavy metal | heavy-metal |
| hit-and-run | and-run | |
| Mt. Fuji | △Fuji | |
| Fu☆ji | Fu・ji | |

FIG.11

INFORMATION PROCESSING DEVICE, INFORMATION PROCESSING METHOD, INFORMATION PROCESSING DEVICE PROGRAM, AND RECORDING MEDIUM

CROSS REFERENCE TO RELATED APPLICATIONS

This is a National Stage of International Application No. PCT/JP2012/070442 filed Aug. 10, 2012, claiming priority based on Japanese Patent Application No. 2011-256055 filed Nov. 24, 2011, the contents of all of which are incorporated herein by reference in their entirety.

TECHNICAL FIELD

The present invention relates to a technical field of an information processing device, an information processing method, an information processing device program, and a recording medium which generate a dictionary.

BACKGROUND ART

Dictionaries of synonyms (thesaurus dictionaries) are useful for search processing or processing of transforming search words inputted for searching. For example, new products or services are provided one after another on Internet, and new words are created. The thesaurus dictionaries also need to support these new words. For example, Patent Document 1 discloses a dictionary generating device which learns an association between words based on a frequency table obtained by integrating a co-occurrence frequency table of words in a predetermined range in document and a thesaurus frequency table obtained by transforming thesaurus information into a virtual frequency table, and creates a conceptual dictionary by compressing the integrated frequency table.

CITATION LIST

Patent Document

Patent Document 1: Japanese Patent Application Laid-Open No. 2005-250762

SUMMARY OF THE INVENTION

Problem to be Solved by the Invention

However, although Patent Document 1 discloses a technique of generating a thesaurus dictionary in a conventional technique, people need to take on a burden of, for example, making a layer structure between words in advance as preprocessing.

The present invention is made in light of this problem, and an example of the task of the present invention is to provide, for example, an information processing device which generates a thesaurus dictionary from search words used for searching.

Means for Solving the Problem

In order to solve the above problem, an exemplary embodiment includes: a pair search word generating means that, in association with user specifying information for specifying a user who uses search words and search time specifying information for specifying search times which are times at which search processing is executed using the search words, generates a pair search word which is obtained by forming a pair of a preceding search word and a subsequent search word in the search times in accordance with an order of the search times, from search words in which intervals between the search times associated with the identical user specifying information are within a predetermined time, with reference to a search word memory means that stores the search words; a first appearance count calculating means that calculates a first appearance count that a specific pair search word appears among pair search words generated by the pair search word generating means; a second appearance count calculating means that calculates a second appearance count that a reverse order pair search word obtained by reversing a search time of the specific pair search word appears; and a memory means that, when a magnitude relationship between the first appearance count and the second appearance account calculated by the first and second appearance count calculating means satisfies a predetermined condition, stores the preceding search word and the subsequent search word as a thesaurus.

In the information processing device described above, an exemplary embodiment is characterized in that, when a difference between the first appearance count and the second appearance count calculated by the first and second appearance count calculating means is in a predetermined range, the memory means stores the preceding search word and the subsequent search word as the thesaurus.

In the information processing device described above, an exemplary embodiment is characterized in that the pair search word generating means generates the pair search word by processing character strings of the preceding search word and the subsequent search word.

In the information processing device described above, an exemplary embodiment is characterized in that the pair search word generating means generates the pair search word by performing character string processing of deleting a predetermined letter from the previous search and the subsequent search word with reference to a deletion letter memory means that stores in advance a letter for deleting the predetermined letter from the search words.

In the information processing device described above, an exemplary embodiment is characterized in that, when the number of search words is two or more and there is a common search word between the preceding search word and the subsequent search word, the pair search word generating means generates the pair search word from the preceding search word and the subsequent search word from which the common search word is deleted.

In the information processing device described above, an exemplary embodiment is characterized in that the information processing device further includes a search word acquiring means that acquires a first search word and a second search word with reference to the search word memory means, and when character strings of the first search word and the second search word acquired by the search word acquiring means are processed, and when an inclusion relationship establishes between the first search word and the second search word the character strings of which are processed, the memory means stores the first search word and the second search word as the thesaurus.

In the information processing device described above, an exemplary embodiment is characterized in that when the inclusion relationship is decided by performing character string processing of comparing each letter of the first and second search words in accordance with an order of the character strings of the first search word and the second search word acquired by the search word acquiring means, and when the inclusion relationship establishes, the memory means stores the first search word and the second search word as the thesaurus.

In the information processing device described above, an exemplary embodiment is characterized in that when character string processing of deleting a predetermined letter is performed from the first search word and the second search word acquired by the search word acquiring means with reference to a deletion letter memory means that stores in advance a letter for deleting a predetermined letter from the search word, and when an inclusion relationship establishes between the first search word and the second search word from which the predetermined letter is deleted, the memory means stores the first search word and the second search word as the thesaurus.

In the information processing device described above, an exemplary embodiment is characterized in that, in case that the number of search words is two or more and there is a common search word between the first search word and the second search word, when an inclusion relationship in case that the predetermined letter is deleted establishes between the first and second search words from which the common search word is deleted, the memory means stores as the thesaurus the first and second search words from which the common search word is deleted.

In the information processing device described above, an exemplary embodiment is characterized in that the memory means stores two search words as the thesaurus together with a search word having a relationship of the thesaurus with at least one of the two search words stored as the thesaurus with reference to a thesaurus database of search words stored as the thesaurus.

In the method of processing information in the information processing device that processes information, an exemplary embodiment includes: a pair search word generating step of, in association with user specifying information for specifying a user who uses search words and search time specifying information for specifying search times which are times at which search processing is executed using the search words, generating a pair search word which is obtained by forming a pair of a preceding search word and a subsequent search word in the search times in accordance with an order of the search times, from search words in which intervals between the search times associated with the identical user specifying information are within a predetermined time, with reference to a search word memory means that stores the search words; a first appearance count calculating step of calculating a first appearance count that a specific pair search word appears among pair search words generated in the pair search word generating step; a second appearance count calculating step of calculating a second appearance count that a reverse order pair search word obtained by reversing a search time of the specific pair search word appears; and a memory step of, when a magnitude relationship between the first appearance count and the second appearance account calculated in the first and second appearance count calculating steps satisfies a predetermined condition, storing the preceding search word and the subsequent search word as a thesaurus.

An exemplary embodiment causes a computer to function as: a pair search word generating means that, in association with user specifying information for specifying a user who uses search words and search time specifying information for specifying search times which are times at which search processing is executed using the search words, generates a pair search word which is obtained by forming a pair of a preceding search word and a subsequent search word in the search times in accordance with an order of the search times, from search words in which intervals between the search times associated with the identical user specifying information are within a predetermined time, with reference to a search word memory means that stores the search words; a first appearance count calculating means that calculates a first appearance count that a specific pair search word appears among pair search words generated by the pair search word generating means; a second appearance count calculating means that calculates a second appearance count that a reverse order pair search word obtained by reversing a search time of the specific pair search word appears; and a memory means that, when a magnitude relationship between the first appearance count and the second appearance account calculated by the first and second appearance count calculating means satisfies a predetermined condition, stores the preceding search word and the subsequent search word as a thesaurus.

An exemplary embodiment has a computer-readable information processing device program recorded thereon that causes the computer to function as: a pair search word generating means that, in association with user specifying information for specifying a user who uses search words and search time specifying information for specifying search times which are times at which search processing is executed using the search words, generates a pair search word which is obtained by forming a pair of a preceding search word and a subsequent search word in the search times in accordance with an order of the search times, from search words in which intervals between the search times associated with the identical user specifying information are within a predetermined time, with reference to a search word memory means that stores the search words; a first appearance count calculating means that calculates a first appearance count that a specific pair search word appears among pair search words generated by the pair search word generating means; a second appearance count calculating means that calculates a second appearance count that a reverse order pair search word obtained by reversing a search time of the specific pair search word appears; and a memory means that, when a magnitude relationship between the first appearance count and the second appearance account calculated by the first and second appearance count calculating means satisfies a predetermined condition, stores the preceding search word and the subsequent search word as a thesaurus.

Effect of the Invention

The present invention generates, in association with user specifying information for specifying a user who uses search words and search time specifying information for specifying search times which are times at which search processing is executed using the search words, a pair search word which is obtained by forming a pair of a preceding search word and a subsequent search word in the search times in accordance with an order of the search times, from search words in which intervals between the search times associated with the identical user specifying information are within a predetermined time, with reference to a search word memory means that stores the search words; calculates a first appearance count that a specific pair search word appears among generated pair search words, calculates a second appearance count that a reverse order pair search word obtained by reversing a search time of the specific pair search word appears, and, when a magnitude relationship between the first appearance count and the second appearance account satisfies predetermined conditions, stores the preceding search word and the subsequent search word as a thesaurus, so that it is possible to generate a thesaurus dictionary from search words used for searching.

BRIEF DESCRIPTION OF THE DRAWINGS

FIG. 9 is a schematic diagram illustrating examples of pair search queries including a directionality.

FIG. 10 is a schematic diagram illustrating an example of a thesaurus stored in a thesaurus database in FIG. 2.

FIG. 11 is a schematic diagram illustrating an example of the thesaurus stored in the thesaurus database in FIG. 2.

MODES FOR CARRYING OUT THE INVENTION

An embodiment of the present invention will be described below with reference to the drawings. In addition, the embodiment will be described where the present invention is applied to an information processing system.

[1. Outline of Configuration and Function of Information Processing System]

First, an outline of a configuration and a function of the information processing system according to an embodiment of the present invention will be described using FIG. 1.

Figure 1:
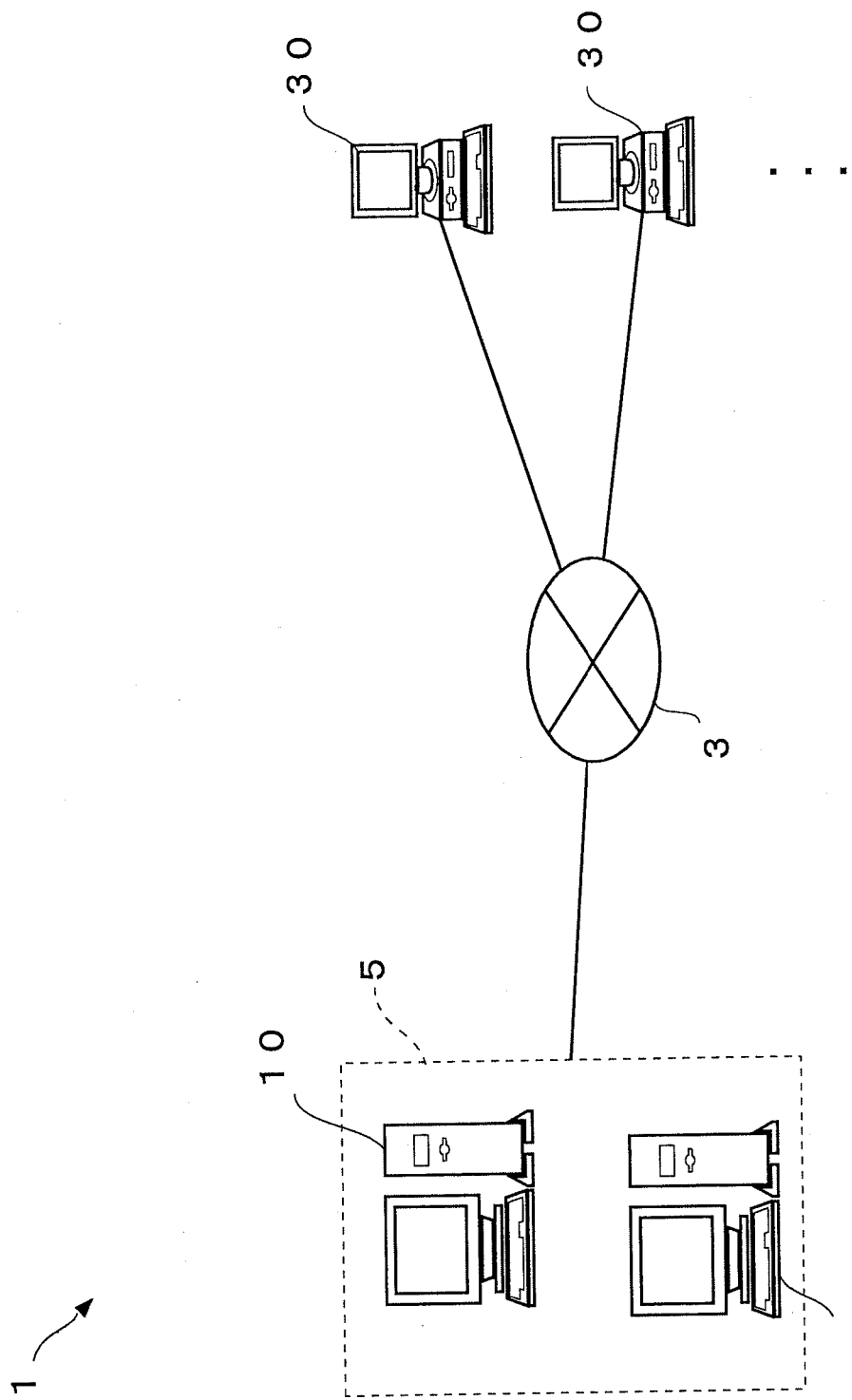
FIG. 1 is a schematic diagram illustrating a schematic configuration example of an information processing system according to an embodiment of the present invention.

FIG. 1 is a schematic diagram illustrating a schematic configuration example of an information processing system 1 according to the present embodiment.

As illustrated in FIG. 1, the information processing system 1 has: an information processing server (an example of an information processing device) 10 which constructs a thesaurus database; a shopping server 20 which is disposed to operate a shopping site utilized by users; and terminal devices 30 through which the users search for and purchase products at a shopping site.

The information processing server 10 and the shopping server 20 are connected through, for example, a local area network, can transmit and receive data to and from each other and configure a server system (an example of an information processing device) 5. Further, the server system 5 and the terminal devices 30 are connected through a network 3, and can transmit and receive data using a communication protocol (for example, TCP/IP). In addition, the network 3 is constructed with, for example, Internet, a dedicated communication line (for example, a CATV (Community Antenna Television) line), a mobile communication network (including, for example, base stations) and a gateway.

Further, the information processing server 10 records search queries of searches performed by users at the terminal devices 30, and generates a thesaurus database from search query logs.

[2. Configuration and Function of Each Server]
(2.1 Configuration and Function of Information Processing Server 10)

Next, a configuration and a function of the information processing server 10 will be described using FIGS. 2 to 4.

Figure 2:
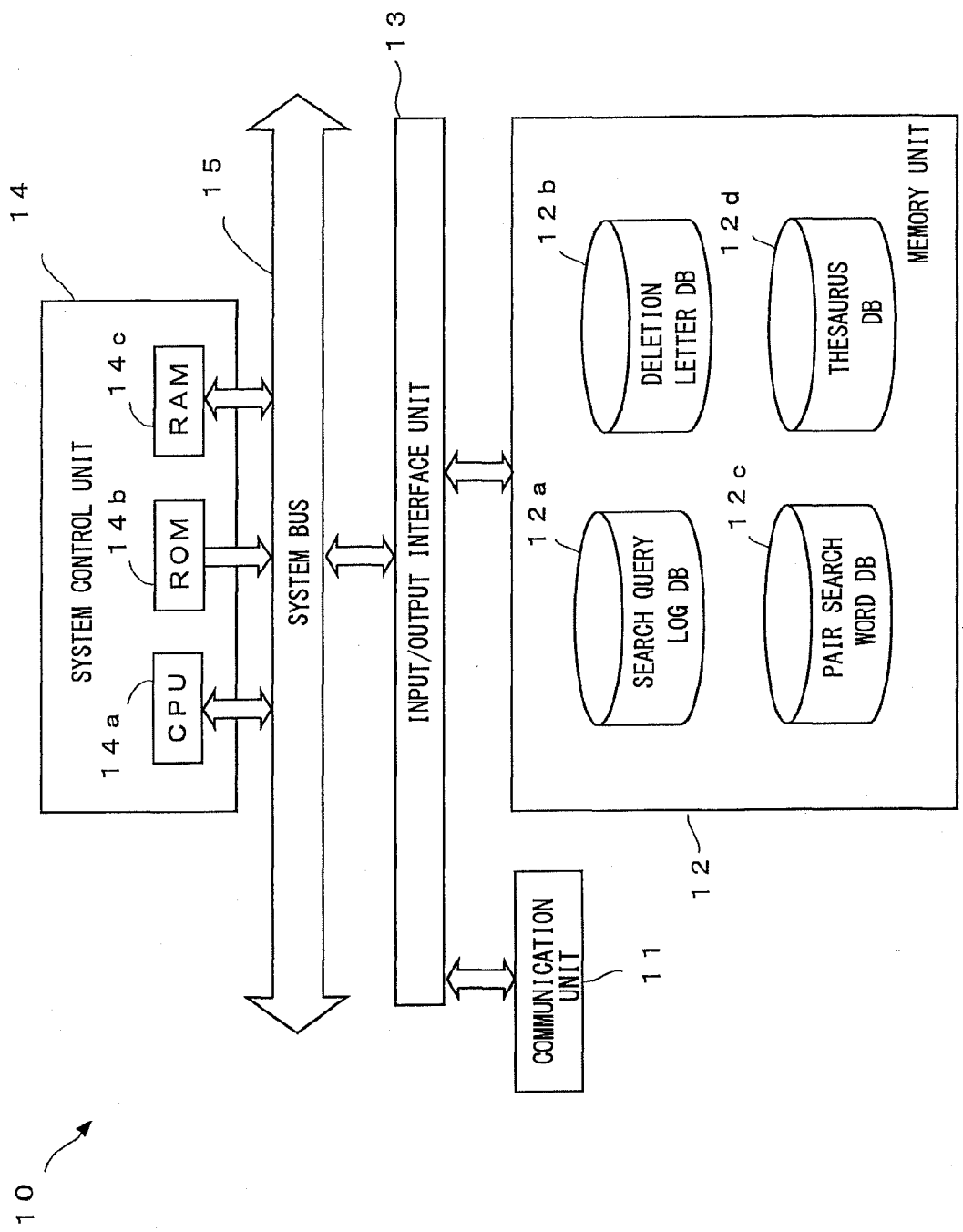
FIG. 2 is a block diagram illustrating an example of a schematic configuration of an information processing server in FIG. 1.

FIG. 2 is a block diagram illustrating an example of a schematic configuration of the information processing server 10. FIG. 3 is a schematic diagram illustrating examples of search query logs stored in a search query log database. FIG. 4 is a schematic diagram illustrating examples of deletion letters stored in a deletion letter database.

As illustrated in FIG. 2, the information processing server 10 which functions as a computer has a communication unit 11, a memory unit 12, an input/output interface unit 13 and a system control unit 14. Further, the system control unit 14 and the input/output interface unit 13 are connected through a system bus 15.

The communication unit 11 connects to the network 3 to control communication states with, for example, the terminal devices 30 and the data search server 7 (not shown), and further connects to the local area network to transmit and receive data to and from another server such as the shopping server 20 on the local area network.

The memory unit 12 has, for example, a hard disk drive, and stores various programs such as an operating system and a server program, and data. In addition, for example, the various programs may be acquired from, for example, another server device through the network 3, or may be recorded in a recording medium and read through a drive device.

Further, in the memory unit 12, for example, a search query log database (referred to as a "search query log DB" below) 12a which stores search queries transmitted from the terminal devices 30 of respective users in accordance with an order of received times, a deletion letter database (referred to as a "deletion letter DB" below) 12b which stores letters for deleting predetermined letters from search words of search queries, a pair search word database (referred to as a "pair search word DB" below) 12c which stores pair search words obtained by forming pairs of search words, and a thesaurus database (referred to as a "thesaurus DB") 12d which stores search words having a thesaurus relationship are constructed.

Figure 3:
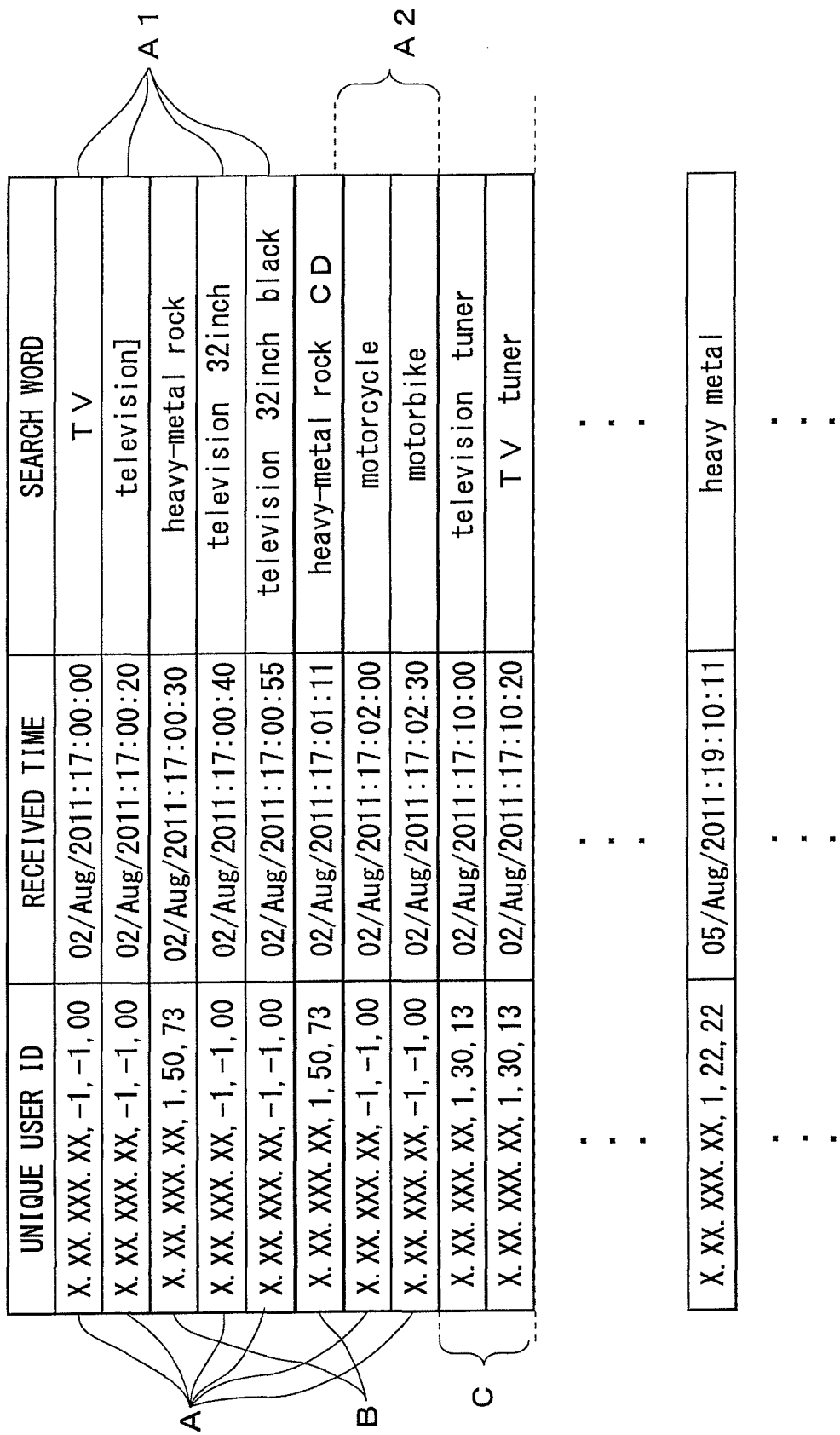
FIG. 3 is a schematic diagram illustrating examples of search query logs stored in a search query log database in FIG. 2.

As in illustrated in FIG. 3, in the search query log DB 12a (an example of a search word memory means), search words are stored in association with unique user IDs (an example of user specifying information for specifying users) for specifying the terminal device 30 of which user has transmitted a search query and dates (received times) when search queries are received from the terminal devices 30. Meanwhile, the unique user ID is configured with an IP address, a code of the sex of the user, a code of the age of the user and a code of a prefecture and city government in which the user resides. The received time is an example of search time specifying information for specifying a search time which is a time at which search processing is executed using a search word. Further, when the terminal device 30 transmits a search query, the terminal device 30 may transmit a search query to which information about a time at which a search button is clicked is added as a search time which is a time at which search processing is executed using a search word. Furthermore, the information processing server 10 may extract a search time from a search query, and store the search time in the search query log DB 12a instead of a received time.

Figure 4:
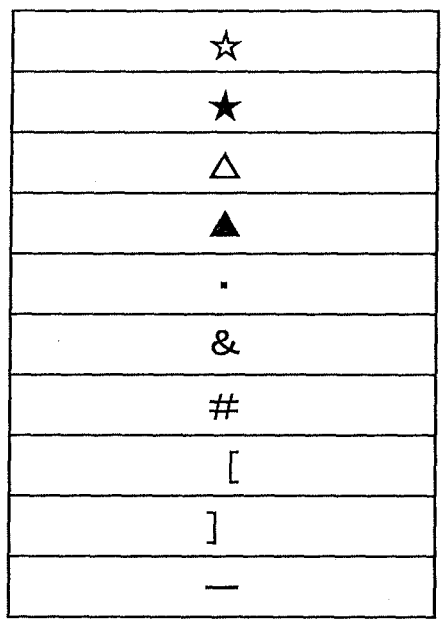
FIG. 4 is a schematic diagram illustrating examples of deletion letters stored in a deletion letter database in FIG. 2.

As illustrated in FIG. 4, in the deletion letter DB 12b, deletion letters such as symbols of "☆" and "★" and letters such as " " (space) which need to be deleted from search words are stored. Further, the deletion letter may be a dash symbol (dash letter) "-".

In the pair search word DB 12c, pair search words obtained by forming pairs of preceding search words and subsequent search words in the order of received times (an example of an order of search times) in accordance with the order of search times are stored.

In the thesaurus DB 12d, search words generated from search query logs and having a thesaurus relationship are stored.

Next, the input/output interface unit 13 performs interface processing between the communication unit 11 and the memory unit 12, and the system control unit 14.

The system control unit 14 has, for example, a CPU (Central Processing Unit) 14a, a ROM (Read Only Memory) 14b and a RAM (Random Access Memory) 14c. When the CPU 14a reads and executes the various programs stored in the ROM 14b and the memory unit 12, the system control unit 14 performs, for example, thesaurus storage processing.

(2.2 Configuration and Function of Shopping Server 20)

Next, a configuration and a function of the shopping server 20 will be described using FIG. 5.

Figure 5:
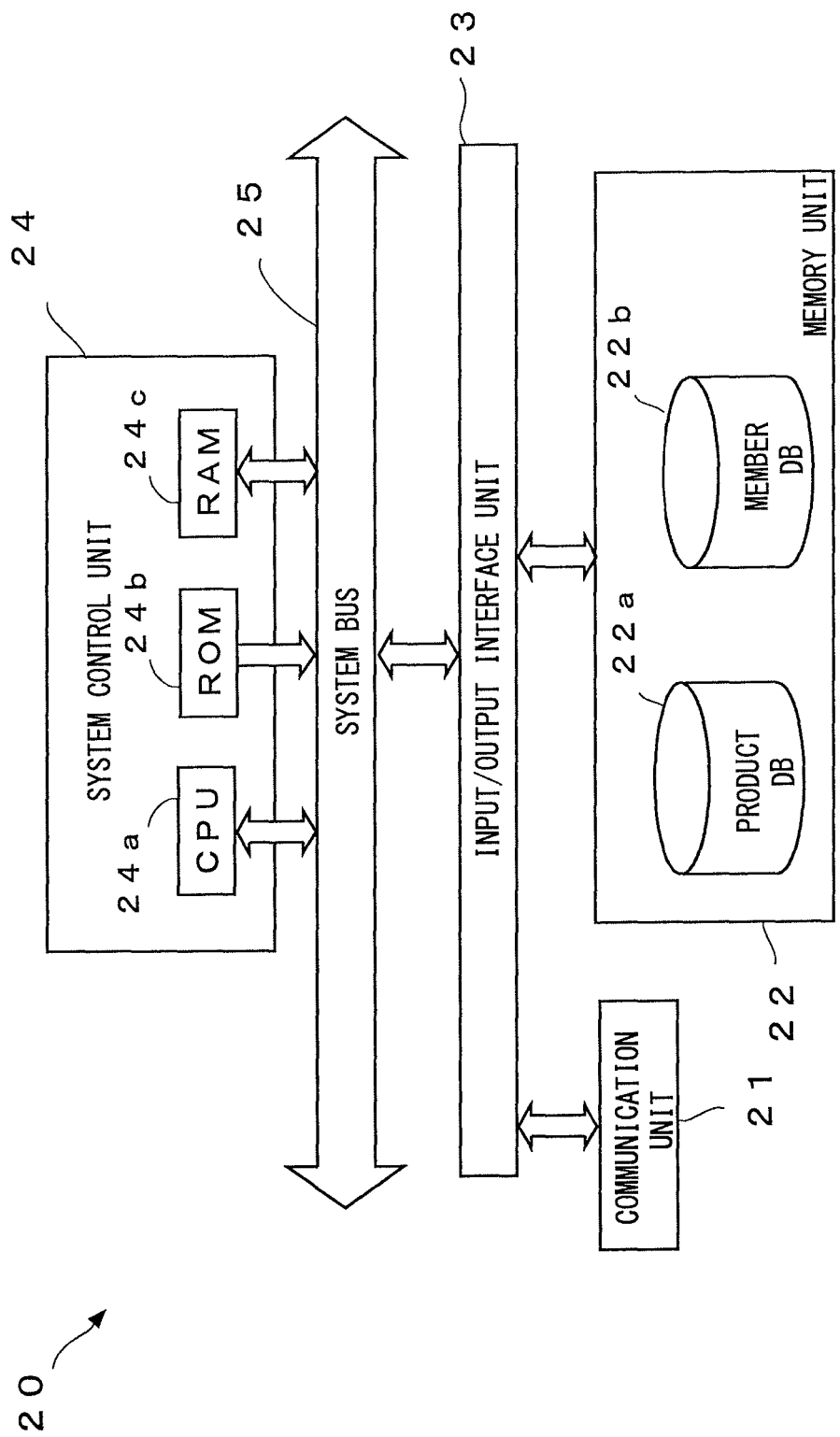
FIG. 5 is a block diagram illustrating an example of a schematic configuration of a shopping server in FIG. 1.

FIG. 5 is a block diagram illustrating an example of a schematic configuration of the shopping server 20.

As illustrated in FIG. 5, the shopping server 20 has a communication unit 21, a memory unit 22, an input/output interface unit 23 and a system control unit 24, and the system control unit 24 and the input/output interface unit 23 are connected through a system bus 25. In addition, the configuration and the function of the shopping server 20 are substantially the same as the configuration and the function of the information processing server 10, and therefore differences from each configuration and each function of the information processing server 10 will be mainly described.

For example, the communication unit 21 controls communication states with the terminal devices 30 and the information processing server 10 through, for example, the network 3 or the local area network.

In the memory unit 22, for example, a product database (referred to as a "product DB" below) 22a and a member database (referred to as a "member DB" below) 22b are constructed.

In the product DB 22a, for example, product information such as product names, types, product images, specifications and summaries of introduction of products and advertisement information are stored in association with product IDs which are identifiers for identifying products. Further, in the product DB 22a, for example, files of product webpages described by markup languages such as HTML and XML are stored.

In the member DB 22b, user information such as user IDs, names, the sex, the age, addresses, telephone numbers, electronic mail address, occupations, hobbies and purchase histories of users registered as members (users of shopping sites), and themes and genres of user's interest are registered. Further, in the member DB 22b, user IDs, log-in IDs and passwords which the users require to log in the shopping sites from the terminal devices 30 are registered. Meanwhile, the log-ID and the password are log-in information used for log-in processing (user authentication processing).

The system control unit 24 has, for example, a CPU 24a, a ROM 24b and a RAM 24c. Further, when the CPU 24a reads and executes various programs stored in ROM 24b and the memory unit 22, the system control unit 24 accepts users' product purchase processings and records a product purchase history per user ID.

(2.3 Configuration and Function of Terminal Device 30)

Next, a configuration and a function of the terminal device 30 will be described using FIG. 6.

Figure 6:
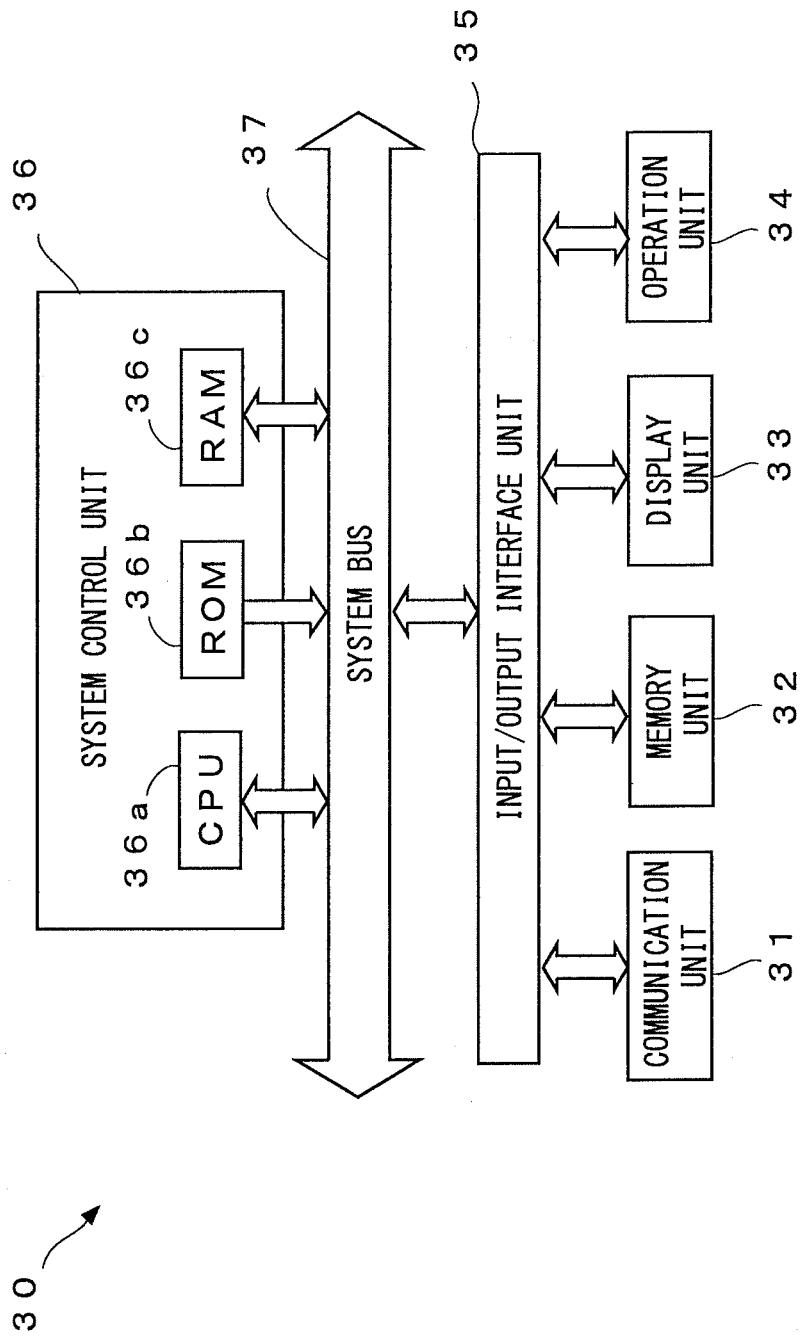
FIG. 6 is a block diagram illustrating an example of a schematic configuration of a user terminal device in FIG. 1.

FIG. 6 is a block diagram illustrating an example of a schematic configuration of the terminal device 30.

As illustrated in FIG. 6, the terminal device 30 which functions as a computer is, for example, a personal computer or a mobile terminal such as a mobile wireless telephone or a PDA, and has a communication unit 31, a memory unit 32, a display unit 33, an operation unit 34, an input/output interface unit 35 and a system control unit 36. Further, the system control unit 36 and the input/output interface unit 35 are connected through a system bus 37.

The communication unit 31 controls communication with, for example, the information processing server 10 through the network 3. In addition, when the terminal device 30 is a mobile wireless telephone, the communication unit 31 has a wireless communication function of connecting to a mobile communication network of the network 3.

The memory unit 32 has, for example, a hard disk drive, and stores, for example, an operating system and a web browser program.

The display unit 33 is formed with, for example, liquid crystal elements or EL (Electro Luminescence) elements. The display unit 33 displays, for example, webpages acquired from the information processing server 10.

The operation unit 34 includes, for example, a keyboard and a mouse. The user inputs a response through the operation unit 34. In addition, when the display unit 33 is a display panel of a touch-switch type, the operation unit 34 acquires position information about a site pushed on the screen of the display unit 33.

The input/output interface unit 35 is an interface between the communication unit 31 and the memory unit 32, and the system control unit 36.

The system control unit 36 has, for example, a CPU 36a, a ROM 36b and a RAM 36c. When the CPU 36a reads and executes various programs stored in the ROM 36b, the RAM 36c and the memory unit 32, the system control unit 36 performs processing.

[3. Operation of Information Processing System According to First Embodiment]

Next, an operation of the information processing system 1 according to the first embodiment of the present invention will be described using FIGS. 7 to 12.

Figure 7:
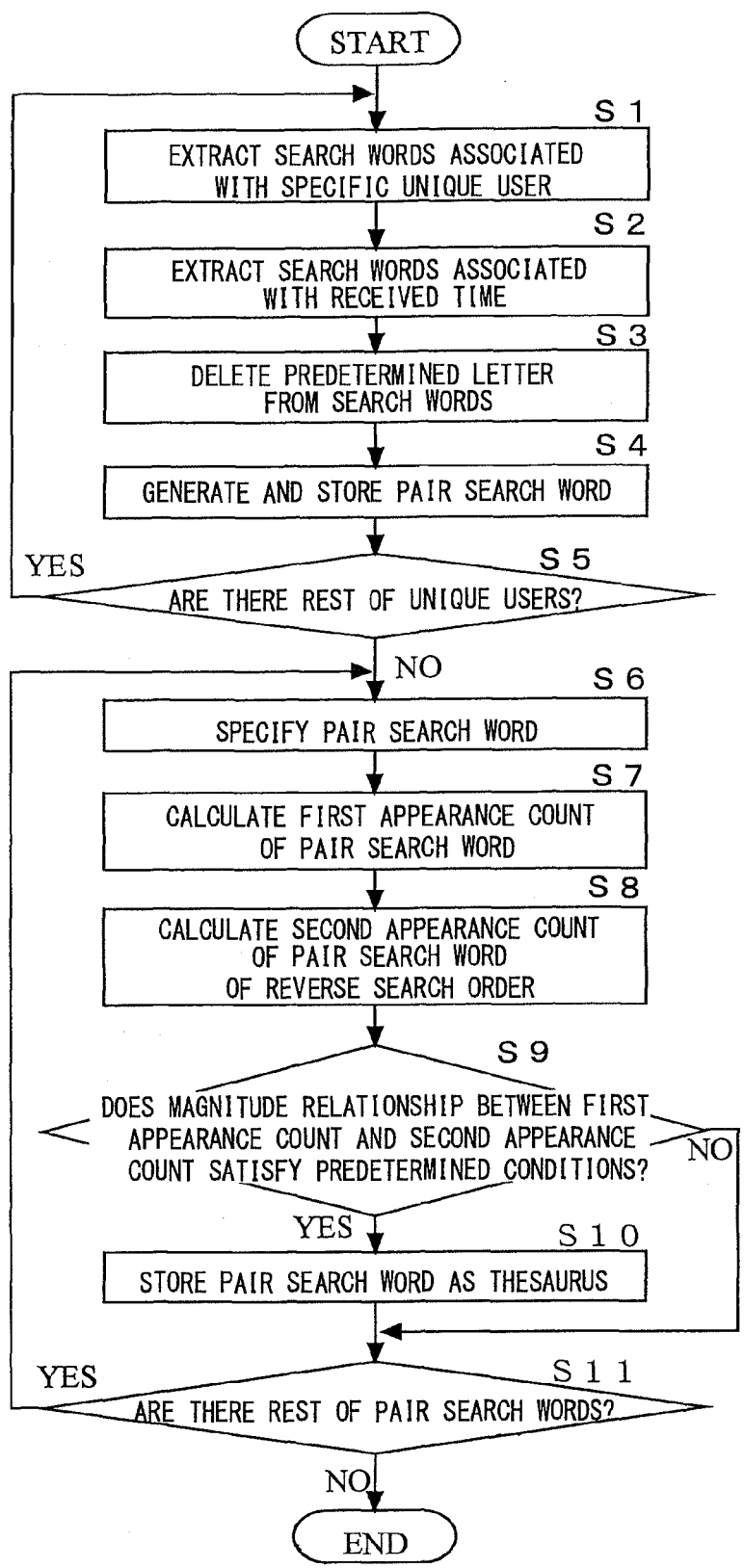
FIG. 7 is a flowchart illustrating an operation example of the information processing system in FIG. 1 according to a first embodiment.
Figure 8:
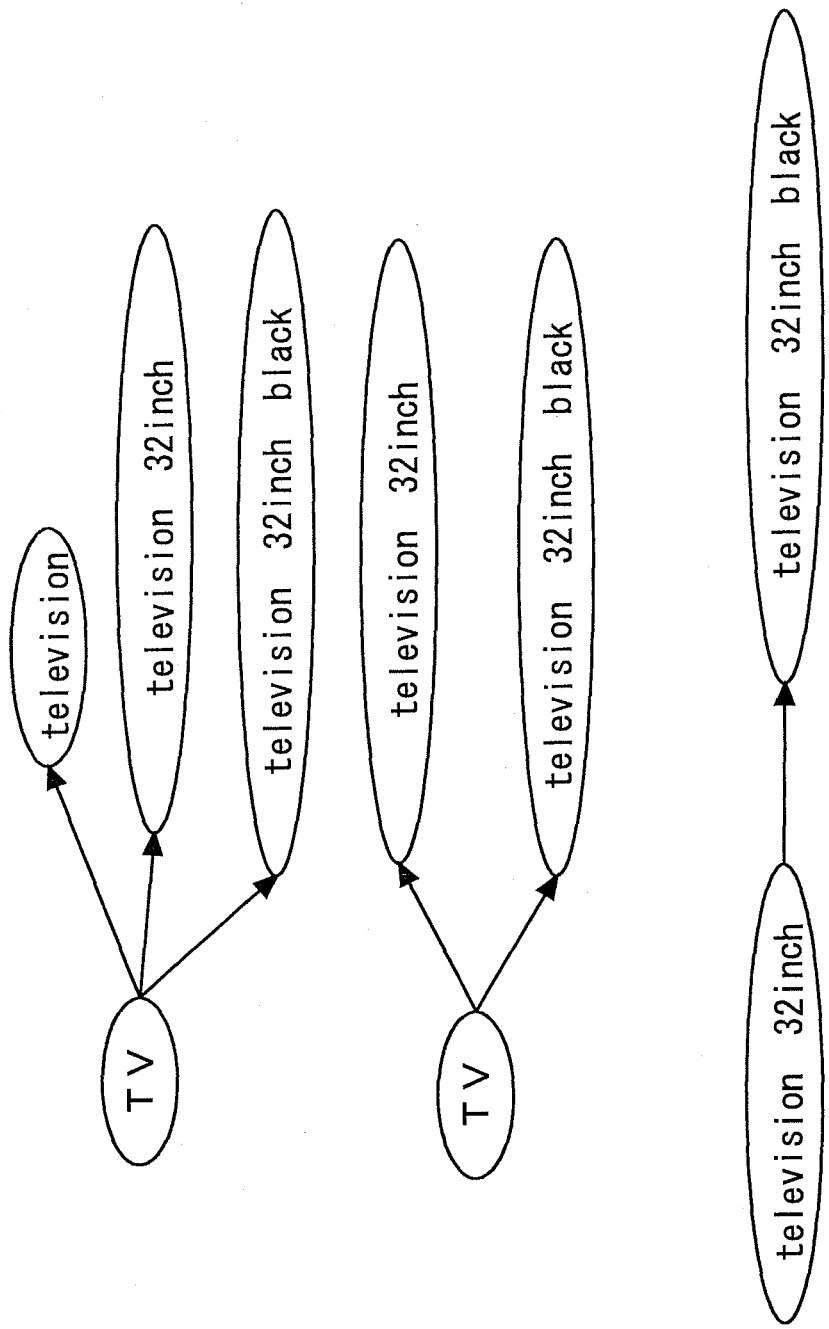
FIG. 8 is a schematic diagram illustrating examples of pair search queries stored in a pair search query database in FIG. 2.
Figure 12:
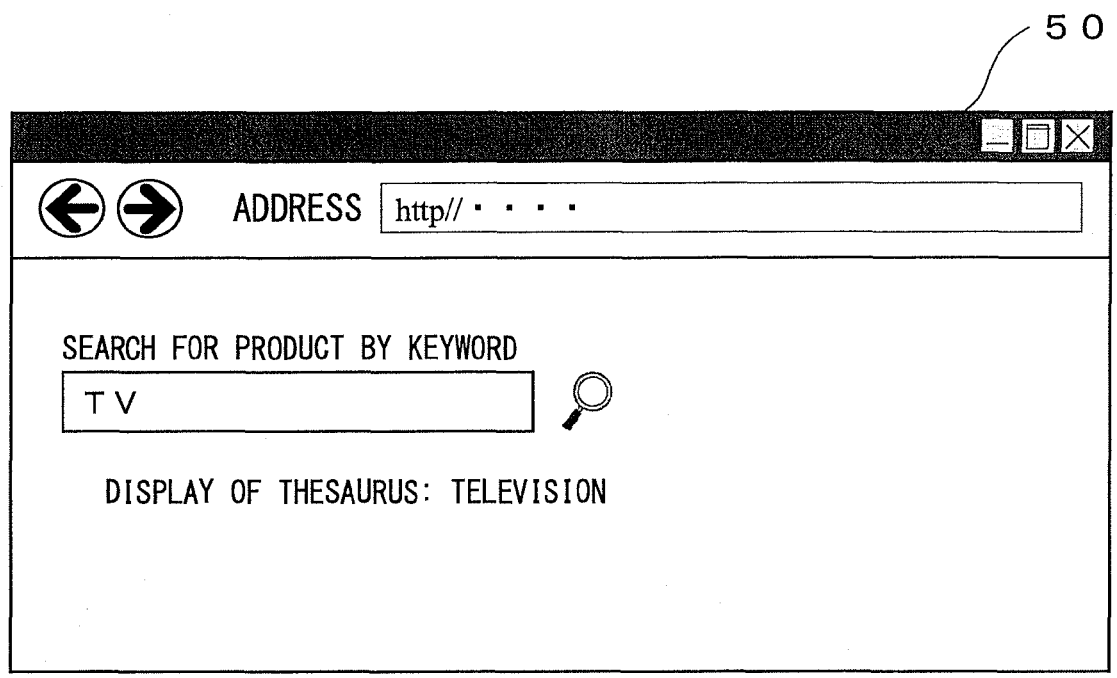
FIG. 12 is a schematic diagram illustrating an example thesaurus display in response to a search word.

FIG. 7 is a flowchart illustrating an operation example of the information processing system according to the first embodiment. FIG. 8 is a schematic diagram illustrating examples of pair search queries stored in the pair search word DB 12c. FIG. 9 is a schematic diagram illustrating examples of pair search queries including a directionality. FIG. 10 is a schematic diagram illustrating an example of a thesaurus stored in a thesaurus database. FIG. 11 is a schematic diagram illustrating an example of the thesaurus stored in a thesaurus database. FIG. 12 is a schematic diagram illustrating an example thesaurus display in response to a search word.

First, the user accesses the shopping server 20, inputs a user ID or a log-in ID, inputs a password and logs in a shopping site. The terminal device 30 transmits the user ID or the log-in ID and the password to the shopping server 20.

Next, when the user inputs a search word in order to search for a product at the shopping site, and searches for the product, the terminal device 30 transmits a search query including the search word to the shopping server 20. The shopping server 20 receives the search query from the terminal device 30.

The shopping server 20 searches for the product with reference to the product DB 22a based on the search word. In this case, the shopping server 20 transmits the received search query and the IP address included in packets of the search query to the information processing server 10 together with the user ID or the log-in ID.

The information processing server 10 acquires the sex, the age and the address of the user with reference to the member DB 22b of the shopping server 20 based on the user ID or the log-in ID received from the shopping server 20. Further, the information processing server 10 generates a unique user ID (an example of user specifying information for specifying the user who uses the search word) from the received IP address, and the sex code, the age code and the prefecture and city government code of the address of the user. In addition, instead of a unique user ID generated from, for example, the IP address and the sex code of the user, a user ID or a log-in ID upon log-in may be used to enhance user's identify. Further, the unique user ID may be obtained by combining an IP address and a user ID or a log-in ID. Furthermore, when a unique user ID including the IP address is used, if the same user makes an access from a provider of a different IP address, the user is regarded as a different user in the search query log DB 12a.

The information processing server 10 stores a search query received from each terminal device 30 through the shopping server 20, in the search query log DB 12a in association with the unique user ID and a received time. The information processing server 10 constructs the search query log DB 12a which stores search words in accordance with an order of search times at which search queries are acquired. In addition, a received time is an example of search time specifying information for specifying a search time which is a time at which search processing is executed using a search word, and may be a time when the information processing server 10 receives a search query from the shopping server 20 or a time at which the shopping server 20 receives a search query from the terminal device 30.

When the number of search queries is the predetermined number or more, or at a predetermined time, the information processing server 10 starts storage processing with respect to a thesaurus DB 12d described below.

As illustrated in FIG. 7, the information processing server 10 extracts a search query associated with a specific unique user ID (step S1). More specifically, as an example of a search word associated with identical user specifying information, the system control unit 14 of the information processing server 10 specifies one unique user ID and extracts the search query associated with the unique user ID with reference to the search query log DB 12a. As illustrated in FIG. 3, the system control unit 14 of the information processing server 10 extracts, for example, search queries of A portions. In this case, B portions of different unique user IDs are removed.

Next, the information processing server 10 extracts search words associated with received times (step S2). More specifically, the system control unit 14 of the information processing server 10 extracts and groups search words which the interval between received times (an example of search times) is within a predetermined time as an example of search words associated with search time specifying information, from the extracted search words associated with the specific unique user ID.

As illustrated in FIG. 3, for example, the system control unit 14 of the information processing server 10 groups the search words of the A portions into a group A1 and a group A2 including intervals between received times within 60 seconds. The search words in which the interval between received times is within a predetermined time include less separate time intervals for performing searching again, so that users are highly likely to perform searching for specific products by inputting search words again.

Next, the information processing server 10 deletes a predetermined character string from the search word (step S3). More specifically, as an example of character string processing of a preceding search word and a subsequent search word, the system control unit 14 of the information processing server 10 deletes a predetermined letter when there is a predetermined character in the search words with reference to the deletion letter DB 12b, and transforms the search words into the search words from which the predetermined letter is deleted. When, for example, the search word is "television]", "]" is deleted to obtain the search word of "television". In this case, "]" was pushed together by mistake when an Enter key is pushed.

Thus, the information processing server 10 functions as an example of a pair search word generating means which generates a pair search word by processing character strings of a preceding search word and a subsequent search word. Further, the information processing server 10 functions as an example of a pair search word generating means which generates a pair search word by performing character string processing of deleting a predetermined letter from the preceding search word and the subsequent search word with reference to the deletion letter memory means which stores in advance letters for deleting the predetermined letter from the search words.

Next, the information processing server 10 generates and stores a pair search word (step S4). More specifically, the system control unit 14 of the information processing server 10 generates a pair search word obtained by forming a pair of a preceding search word and a subsequent search word in the order of received times in accordance with the order of search times, from grouped search queries associated with the unique user ID and a predetermined time with reference to the search query log DB 12a. Further, the system control unit 14 of the information processing server 10 stores the generated pair search word in the pair search word DB 12c. Thus, the information processing server 10 functions as an example of a pair search word generating means which generates a pair search word obtained by forming a pair of a preceding search word and a subsequent search word of search times in accordance with the order in search times, from search words in which intervals between search times associated with the identical user specifying information are within a predetermined time.

As illustrated in FIG. 8, pair search words including directionalities of the order of search times are generated for the search words of the group A1 such as "TV", "television", "television 32 inch" and "television 32 inch black". When the number of search words of the group A1 is n, the number of pair search words is $_nC_2$ which is a combination of each group.

In addition, the search word "television 32 inch" and the search word "television 32 inch black" include common search words "television" and "32 inch". The information processing server 10 may delete only "32 inch" which is one of the common search words such that the number of the original search words is not zero, and generate a pair search word ("television"->"television black") of the search word "television" and a search word "television black". Further, as illustrated in FIG. 3, in case of a search word "television tuner" and a search word "TV tuner", the information processing server 10 may delete a common search word "tuner" and generate a pair search word ("television"->"TV"). Furthermore, generally speaking, search words are usually inputted in order of, for example, "entity, attribute value, attribute value and . . . ", and therefore "television" which appears first among a plurality of search words may be left as in this example.

Thus, the information processing server 10 functions as an example of a pair search word generating means which generates a pair search word obtained by forming a pair of a preceding search word and a subsequent search word in the search times in accordance with the order of the search times, from search words associated with user specifying information and search time specifying information. Further, the information processing server 10 functions as an example of a pair search word generating means which generates the pair search word of the preceding search word and the subsequent search word from which a predetermined letter is deleted. Furthermore, the information processing server 10 functions as an example of a pair search word generating means which generates a pair search word of a preceding search word and a subsequent search word from which a common search word is deleted when the number of search words is two or more and there is a common search word between the preceding search word and the subsequent search word.

Next, the information processing server 10 decides whether or not there are the rest of unique user IDs (step S5). More specifically, when there is a unique user ID to be specified next (step S5; YES), the system control unit 14 of the information processing server 10 returns to step S1 and extracts search words according to the unique user ID to be specified next. As illustrated in FIG. 3, the system control unit 14 of the information processing server 10 extracts, for example, search words in the B portions. When there is not a unique user ID to be specified next (step S5; NO), the system control unit 14 of the information processing server 10 performs processing in step S6. In step S2, intervals between the received times are longer than 60 seconds, and therefore the search words in the B portions are not grouped. Further, the intervals between received times are within 60 seconds, and therefore the search words in C portions are grouped in step S2. Furthermore, a common search word "tuner" is deleted from the search words in the C portions, and a pair search word ("television"->"TV") is generated.

Thus, as illustrated in FIG. 9, the system control unit 14 of the information processing server 10 constructs the pair search word DB 12c.

Next, the information processing server 10 specifies a pair search word (step S6). More specifically, the system control unit 14 of the information processing server 10 specifies a given pair search word (for example, "TV"->"television") with reference to the constructed pair search word DB 12c. In addition, when the sum of $_nC_2$ which is the number of combination of each group is a predetermined number or more, processings subsequent to step S6 may be performed.

Next, the information processing server 10 calculates a first appearance count of a pair search word (step S7). More specifically, the system control unit 14 of the information processing server 10 calculates the first appearance count of the pair search word (for example, "TV"->"television") with reference to the pair search word DB 12c. Meanwhile, the appearance count is calculated for all pair search words in the pair search word DB 12c. That is, the appearance count is the number of times of searching performed by all users who performed searching.

Thus, the information processing server 10 functions as an example of a first appearance count calculating means which calculates a first appearance count that a specific pair search word appears in the generated pair search words.

Next, the information processing server 10 calculates a second appearance count of a pair search word having the reverse order of received times (step S8). More specifically, the system control unit 14 of the information processing server 10 calculates the second appearance count of a pair search word (for example, "television"->"TV") having the reverse order of received times with reference to the pair search word DB 12c.

Thus, the information processing server 10 functions as an example of a second appearance count calculating means which calculates the second appearance count that a reverse order pair search word obtained by reversing the order of search times of specific pair search words appears.

Next, the information processing server 10 decides whether or not the magnitude relationship between the first appearance count and the second appearance count satisfies predetermined conditions (step S9). More specifically, when the difference between the calculated first appearance count and second appearance count is in a predetermined range, the system control unit 14 of the information processing server 10 decides whether or not the magnitude relationship between the first appearance count and the second appearance count satisfies the predetermined conditions.

Meanwhile, when appearance counts in case of a pair search word "television"->"TV" and a pair search word "TV"->"television" balance, that is, the magnitude relationship between appearance counts satisfies predetermined conditions, bidirectionality of a search order is high. That is, from the view point of all users, a search word is inputted again from "television" to "TV or a search word is inputted again from "TV" to "television", and it is decided that the search word "television" and the search word "TV" have a thesaurus relationship.

Meanwhile, as an example where the magnitude relationship between appearance counts does not satisfy the predetermined conditions, when, as to a pair search word "C"->"C++", the second appearance count of a pair search word "C++"->"C" based on a reverse search order is zero or is extremely low compared to the first appearance count of a pair search word "C"->"C++", the pair search word "C"->"C++" has no bidirectionality. In this case, the search word "C" and the search word "C++" do not have a thesaurus relationship.

In addition, as an example where the magnitude relationship between the first appearance count and the second appearance count satisfies predetermined conditions, a difference between, a ratio of or a log of an appearance count of a given pair search word (A->B) and an appearance count of a pair search word (B->A) having a reverse order of received times may be in a predetermined range.

Next, when the magnitude relationship between appearance counts satisfies predetermined conditions (step S9; YES), the information processing server 10 stores a pair search word as a thesaurus (step S10). More specifically, as illustrated in FIG. 10, the system control unit 14 of the information processing server 10 stores pair search words which have the magnitude relationship between appearance accounts satisfying predetermined conditions, in the thesaurus data DB 12d.

Further, two search words are stored as a thesaurus in a thesaurus database together with a search word having a thesaurus relationship with at least one of two search words stored as the thesaurus. When, for example, the search word "TV" and the search word "television" are stored in advance in the thesaurus data DB 12*d* as the thesaurus, and the pair search word "television"->"TV" is stored in step S9, the search word "TV", the search word "television" and the search word "TV" are stored in the thesaurus data DB 12*d* as the thesaurus as illustrated in FIG. 10.

Thus, the information processing server 10 functions as an example of a memory means which, when a magnitude relationship between the first appearance count and the second appearance count satisfies predetermined conditions, stores the preceding search word and the subsequent search word as the thesaurus. Further, the information processing server 10 functions as an example of a memory means which, when a difference between the calculated first appearance count and second appearance count is in a predetermined range, stores the preceding search word and the subsequent search word as the thesaurus. Furthermore, the information processing server 10 functions as an example of a memory means which stores two search words as a thesaurus together with a search word having a thesaurus relationship with at least one of two search words stored as a thesaurus with reference to the thesaurus database.

Next, the information processing server 10 decides whether or not there are the rest of pair search words (step S11). More specifically, the system control unit 14 of the information processing server 10 decides whether or not there is a pair search word to be specified next with reference to the pair search word DB 12*c*.

Next, when there are the rest of pair search words (when there is a pair search word to be specified next) (step S11; YES), the system control unit 14 of the information processing server 10 returns to step S6, and specifies the next pair search word.

As illustrated in FIG. 10, in case of a pair search word "motorcycle"->"motorbike", the system control unit 14 of the information processing server 10 also calculates the second appearance count of the pair search word "motorcycle"->"motorbike" having the reverse search order, decides whether or not the magnitude relationship between the first appearance count and the second appearance count satisfies predetermined conditions and stores the search word "motorcycle" and the search word "motorbike" in the thesaurus data DB 12*d*.

As illustrated in FIG. 11, when search words are in English and a pair search word is "TV"->"television, the system control unit 14 of the information processing server 10 also calculates the second appearance count of the pair search word "television"->"TV" having a reverse search word, decides whether or not the magnitude relationship between the first appearance count and the second appearance count satisfies predetermined conditions and stores the search word "TV" and the search word "television" in the thesaurus data DB 12*d*.

When there is not the rest of pair search word (step S11; NO), the system control unit 14 of the information processing server 10 finishes thesaurus storage processing.

The shopping server 20 receives search words from the terminal device 30 and, when finding a search word having a thesaurus relationship in the received search words with reference to the constructed thesaurus data DB 12*d*, displays the search word having the thesaurus relationship on a webpage 50 of product search as in FIG. 12.

As described above, according to the present embodiment, in association with a unique user ID (an example of user specifying information for specifying a user who uses search words) and a received time (an example of search time specifying information for specifying search times which are times at which search processing is executed using the search word), a pair search word which is obtained by forming a pair of a preceding search word and a subsequent search word in the received times is generated in accordance with an order of the received times, from search words in which intervals of the received times associated with the identical unique user ID are within a predetermined time, with reference to the search query log DB 12*a* (search word memory means) that stores the search words, a first appearance count that a specific pair search word appears among generated pair search words is calculated, a second appearance count that a reverse order pair search word obtained by reversing a search time of the specific pair search word appears is calculated, and, when a magnitude relationship between the first appearance count and the second appearance account satisfies predetermined conditions, the preceding search word and the subsequent search word are stored as a thesaurus, so that it is possible to generate a thesaurus dictionary from search words used for searching.

The information processing server 10 generates a thesaurus dictionary, so that it is possible to help generate the thesaurus dictionary and reduce a burden on people.

Further, in case of a search word associated with user specifying information like a search word associated with the identical user specifying information, a supposedly identical user is highly likely to perform searching based on a given theme, so that precision of the thesaurus dictionary improves.

Furthermore, in case of search words associated with search time specifying information like search words having intervals between search times in a predetermined time, the identical theme is highly likely to be searched for at substantially the same time, so that precision of the thesaurus dictionary improves.

Still further, when a difference between the first appearance count and the second appearance count calculated by the first and second appearance count calculating means is in a predetermined range, if the preceding search word and the subsequent search word are stored as a thesaurus, bidirectionality of a pair search word improves, so that precision of the thesaurus dictionary improves.

Moreover, when a pair search word is generated by processing character strings of the preceding search word and the subsequent search word, for example, a pair search word from which a predetermined letter is deleted can be counted, the number of pair search words which can be counted increases, the first and second appearance counts are more accurately calculated, and precision of the thesaurus further improves. Further, when a pair search word is generated by performing character string processing of deleting a predetermined letter from the preceding search word and the subsequent search word with reference to the deletion letter DB 12*b* which stores in advance the letters for deleting the predetermined letter from search words, by generating a pair of search queries from the search words from which the character strings are deleted, the pair search word from which the predetermined letter is deleted can also be counted, the number of pair search words which can be collected increases, the first and second appearance counts are more accurately calculated, and precision of the thesaurus further improves.

In case that the number of search words is two or more and there is a common search word between the preceding search word and the subsequent search word, when a page search word is generated from the preceding search word and the subsequent search word from which the common search word is deleted, a pair search word from which the search word is deleted can also be counted, the number of pair search words which can be collected increases, the first and second appearance counts are more accurately calculated, and precision of the thesaurus further improves.

When the information processing server 10 stores two search words in the thesaurus data DB 12d as the thesaurus together with a search word having a thesaurus relationship with at least one of two search words stored as the thesaurus with reference to the thesaurus data DB 12d, a range of the thesaurus is widened for three or more search words and versatility of the thesaurus data DB12d improves.

In addition, in step S3, the system control unit 14 of the information processing server 10 may generate a pair search word as is in step S4 without deleting a predetermined letter or a common word. In this case, when the system control unit 14 of the information processing server 10 calculates appearance counts in step S7 and step S8, the information processing server 10 adds even a pair search word of the search word including a deletion letter to the appearance counts to calculate with reference to the deletion letter DB 12b.

Thus, when a sum of an appearance count of a specific pair search word and an appearance count of a pair search word including the predetermined letter with respect to the pair search word is calculated as the first appearance count with reference to the deletion letter DB 12b which stores in advance letters for deleting a predetermined letter from search words, and a sum of an appearance count of a reverse order pair search word and an appearance count of a reverse order pair search word including a predetermined letter with respect to the reverse order pair search word is calculated as a second appearance count with reference to the deletion letter DB 12b, a pair search word from which the predetermined letter is deleted can also be counted, the number of pair search words which can be collected increases, the first and second appearance counts are more accurately calculated, and precision of the thesaurus further improves.

Further, when a sum of an appearance count of a specific pair search word and an appearance count of a pair search word obtained by adding a common word to a preceding search word and a subsequent search word of the pair search word is calculated as the first appearance count, and a sum of an appearance count of a reverse order pair search word and an appearance count of a reverse order pair search word obtained by adding a common word to a preceding search word and a subsequent word of the reverse order pair search word is calculated as the second appearance count, the pair search word from which the common search word is deleted can also be counted, the number of pair search words which can be collected increases, the first and second appearance counts are more accurately calculated, and precision of the thesaurus further improves.

Furthermore, the system control unit 14 of the information processing server 10 may generate a pair search word as is in step S4 without deleting a predetermined letter or a common word in step S3, and the information processing server 10 may calculate appearance counts without with reference to the deletion letter DB 12b when calculating the appearance counts in step S7 and step S8. When a deletion letter or a common letter is included, pair search words become separate pair search words.

[4. Operation of Information Processing System According to Second Embodiment]

Next, an operation of an information processing system according to a second embodiment will be described using the drawings.

Figure 13:
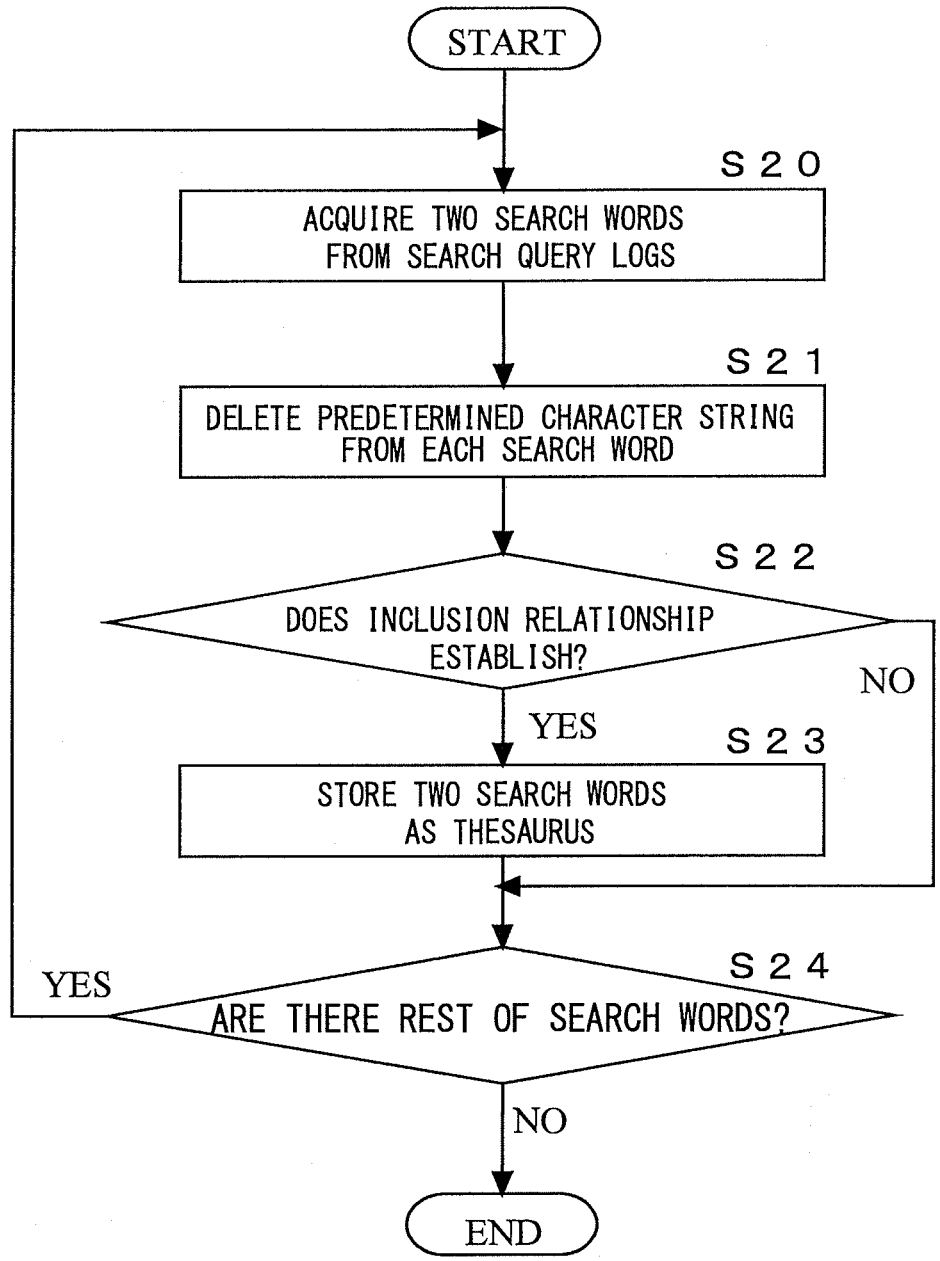
FIG. 13 is a flowchart illustrating an operation example of an information processing system in FIG. 1 according to a second embodiment.

FIG. 13 is a flowchart illustrating an operation example of an information processing system 1 according to the second embodiment.

As illustrated in FIG. 13, an information processing server 10 acquires two search words from a search query log DB 12a (step S20). More specifically, a system control unit 14 of the information processing server 10 extracts the two search words of different received times with reference to the search query log DB 12a. For example, a search word "heavy-metal rock" and a search word "heavy metal" are extracted.

Thus, the information processing server 10 functions as an example of a search word acquiring means which acquires a first search word and a second search word with reference to a search word memory means.

Next, the information processing server 10 deletes a predetermined character string from each search word (step S21). More specifically, as an example of character string processing of a first search word and a second search word, the system control unit 14 of the information processing server 10 deletes a predetermined letter with reference to the deletion letter DB 12b when there is a predetermined character in the search words. A predetermined letter "-" is deleted from the search word "heavy-metal rock", and a search word "heavymetal" is obtained. The search word "heavymetal" does not include a predetermined letter, and is left as is.

Thus, the information processing server 10 functions as an example of a memory means which stores the first search word and the second search word as the thesaurus, when character strings of a first search word and a second search word acquired by the search word acquiring means are processed, and when an inclusion relationship establishes between the first search word and the second search word the character strings of which are processed. Further, the information processing server 10 functions as an example of a memory means which stores the first search word and the second search word as the thesaurus, when character string processing of deleting a predetermined letter is performed from the first search word and the second search word acquired by a search word acquiring means with reference to a deletion letter memory means which stores in advance letters for deleting the predetermined letter from search words, and when an inclusion relationship establishes between the first search word and the second search word from which the predetermined letter is deleted.

Furthermore, in case of a search word "heavy-metal rock CD" and a search word "CD heavymetal", the information processing server 10 deletes a common word "CD" to obtain a search word "heavy-metal rock" and a search word "heavymetal".

Next, the information processing server 10 decides whether or not an inclusion relationship establishes (step S22). More specifically, the system control unit 14 of the information processing server 10 decides whether or not an inclusion relationship establishes between search words from which a predetermined letter is deleted. The search word "heavymetal" is included in the search word "heavymetal rock" (a character string "heavymetal" is common), the system control unit 14 of the information processing server 10 decides that the inclusion relationship establishes. In addition, the inclusion relationship establishes even when the search word "heavymetal" is identical.

When the inclusion relationship establishes (step S22; YES), the information processing server 10 stores two search words as a thesaurus (step S23). More specifically, when an inclusion relationship establishes, the search words have a thesaurus relationship, and the system control unit 14 of the information processing server 10 stores search words in the thesaurus DB 12d as illustrated in FIG. 10.

Thus, the information processing server 10 functions as an example of a memory means which, when an inclusion relationship establishes between the first search word and the second search word from which a predetermined letter is deleted, stores the first search word and the second search word as the thesaurus with reference to the deletion letter memory means.

When the inclusion relationship does not establish (step S22; NO) or after step S23, the information processing server 10 decides whether or not there are the rest of search words (step S24). More specifically, the system control unit 14 of the information processing server 10 decides whether or not there is a combination of search words which is not yet acquired with reference to the search query log DB 12a.

When there are the rest of search words (step S24; YES), the system control unit 14 returns to step S20, and acquires two search words from the search query log DB 12a.

When there are not the rest of search words (step S24; NO), the system control unit 14 of the information processing server 10 finishes thesaurus storage processing.

In addition, in case of a search word "hit-and-run" and a search word "and-run", a common character string "and-run" between the search word "hit-and-run" and the search word "and-run" is equal to the search word "and-run", and the system control unit 14 of the information processing server 10 decides in step S22 that the search word "hit-and-run" and the search word "and-run" have the inclusion relationship.

Further, in case of a search word "Mt. Fuji" and a search word "ΔFuji", the system control unit 14 of the information processing server 10 deletes a letter "Δ" in step S21 to obtain the search word "Mt. Fuji" and the search word "Fuji". Furthermore, a character string "Fuji" which is common between the search word "Fuji" and the search word "Mt. Fuji" is equal to the search word "Fuji", and the system control unit 14 of the information processing server 10 decides in step S22 that the search word "Mt. Fuji" and the search word "ΔFuji" have an inclusion relationship.

Still further, in case of a search word "Fu☆ji" and a search word "Fu•ji", the system control unit 14 of the information processing server 10 deletes a letter "☆" and a letter "•" in step S21 to obtain the search word "Fuji" and the search word "Fuji". These search words match, so that the system control unit 14 of the information processing server 10 decides that the inclusion relationship establishes.

In addition, as an example of character string processing of the first search word and the second search word, the system control unit 14 of the information processing server 10 may decide a matching portion and an unmatching portion in the character strings of the first search word and the second search word and delete the unmatching portion without with reference to the deletion letter DB 12b. For example, in case of the search word "Fu☆ji" and the search word "Fu•ji", "Fuji" is a matching portion, and "☆" and "•" are unmatching portions. Hence, the letter "☆" and the letter "•" are deleted.

Further, as illustrated in FIG. 11, in case of a search word "heavy-metal rock" and a search word "heavymetal", a common character string "heavymetal" is equal to a search word "heavymetal", and the system control unit 14 of the information processing server 10 decides in step S22 that the search word "heavy-metal rock" and the search word "heavymetal" have an inclusion relationship establishes.

Furthermore, in case of a search word "hit-and-run" and a search word "and-run", a common character string "and-run" is equal to the search word "and-run", and the system control unit 14 of the information processing server 10 decides in step S22 that the search word "hit-and-run" and the search word "and-run" have an inclusion relationship.

Still further, in case of a search word "Mt. Fuji" and a search word "ΔFuji", the system control unit 14 of the information processing server 10 deletes the letter "Δ" in step S21 to obtain the search word "Mt. Fuji" and the search word "Fuji".

In case of a search word "Fu☆ji" and a search word "Fu•ji", the system control unit 14 of the information processing server 10 deletes the letter "☆" and the letter "•" in step S21 to obtain the search word "Fuji" and the search word "Fuji". These search words match, so that the system control unit 14 of the information processing server 10 decides that the inclusion relationship establishes.

Further, in case of the search word "heavy-metal rock" and a search word "heavy•metal", the system control unit 14 of the information processing server 10 deletes "-" and "•" in step S21 to obtain the search word "heavymetal rock" and the search word "heavymetal". The search word "heavymetal" is included in the search word "heavymetal rock", and it is decided that the search word "heavy-metal rock" and the search word "heavy•metal" have an inclusion relationship.

Further, in case of a search word "heavy-metal rock" and a search word "heavy-metal", the system control unit 14 of the information processing server 10 deletes "-" in step S21 to obtain a search word "heavymetal rock" and a search word "heavymetal". The search word "heavymetal" is included in the search word "heavymetal rock", and it is decided that the search word "heavy-metal rock" and the search word "heavy-metal" have an inclusion relationship.

As described above, according to the present embodiment, a first search word and a second search word are acquired with reference to the search query log DB 12a (an example of a search word memory means), when character strings of the acquired first search word and second search word are processed, and when an inclusion relationship establishes between the first search word and the second search word the character strings of which are processed, the first search word and the second search word are stored as a thesaurus, so that it is possible to generate a thesaurus dictionary from search words used for searching.

Further, the first search word and the second search word are acquired with reference to the search query log DB 12a (an example of a search word memory means), when character processing of deleting a predetermined letter is performed from the acquired first search word and second search word with reference to the deletion letter DB 12b (an example of a deletion letter memory means) which stores in advance the letters for deleting the predetermined letter from the search word, and when an inclusion relationship establishes between the first search word and the second search word from which the predetermined letter is deleted, the first search word and the second search word are stored as the thesaurus, so that it is possible to generate a thesaurus dictionary from the search words used for searching. Further, a letter which needs to be reliably deleted from the first search word and the second search word can be deleted, and precision to decide the inclusion relationship improves.

Furthermore, the information processing server 10 generates a thesaurus dictionary, so that it is possible to help generate a thesaurus dictionary and reduce a burden on people.

A predetermined letter is deleted from the search word, so that precision of the thesaurus further improves.

Further, by combining operations according to the first embodiment and the second embodiment, the information processing server 10 can construct a thesaurus dictionary having a wide range of the thesaurus.

When the number of search words is two or more and there is a common search word between the first search word and the second search word, and an inclusion relationship in case that the predetermined letter is deleted establishes between the first and second search words from which the common search word is deleted, by storing as a thesaurus the first and second search words from which the common search word is deleted, so that a pair search word from which the common search word is deleted can also be counted, the number of pair search words which can be collected increases, the first and second appearance counts are more accurately calculated, and precision of the thesaurus further improves.

In addition, the information processing server 10 may decide the inclusion relationship by performing character string processing of comparing each letter of the first and second search words in accordance with the order of the character strings of the acquired first search word and second search word and, when the inclusion relationship establish, store the first search word and the second search word as the thesaurus.

In case of the search word "heavy-metal rock" and the search word "heavy•metal", the information processing server 10 compares first letters of character strings and decides that the search word "heavy-metal rock" and the search word "heavy•metal" match because the letters "he" are common. Next, the information processing server 10 decides that a second letter "v" is common and the search word "heavy-metal rock" and the search word "heavy•metal" match. Next, a third letter "-" and a letter "•" are letters in the deletion letter DB 12b, and the information processing server 10 ignores these letters or decides that the letters are the same deletion letters and the search word "heavy-metal rock" and the search word "heavy•metal" match with reference to the deletion letter DB 12b. Further, it is decided that letters match in the fourth letter "me" and in the fifth letter "ta" match and there are no more letters to compare, so that the information processing server 10 decides that the search word "heavy-metal" and the search word "heavy•metal" have an inclusion relationship. Meanwhile, when character strings are compared and corresponding letters are different, the information processing server 10 decides that the inclusion relationship does not establish. Further, when there are a predetermined number of corresponding letters or more in a length of a character string (or, for example, an average of lengths of character strings of the first search word and the second search word), it may be decided that an inclusion relationship establishes.

Thus, step S21 of deleting letters can be skipped, in case that the information processing server 10 stores the first search word and the second search word as a thesaurus, when the information processing server 10 decides the inclusion relationship by performing character string of comparing each letter of the first and second search words in accordance with the order of character strings of the acquired first search word and second search word, and when the inclusion relationship establishes. Further, a specific letter can be deleted with reference to the deletion letter DB 12b and precision to decide the inclusion relationship improves.

Further, the present invention is by no means limited to the above embodiments. The above embodiments are exemplary and employ substantially the same configuration as the technical idea recited in claims of the present invention, and all inventions are incorporated in the technical scope of the present invention as long as they provide the same function and effect.

EXPLANATION OF REFERENCE NUMERALS

1: INFORMATION PROCESSING SYSTEM
10: INFORMATION PROCESSING SERVER (INFORMATION PROCESSING DEVICE)
12a: SEARCH QUERY LOG DB (SEARCH WORD MEMORY MEANS)
12b: DELETION LETTER DB
12c: PAIR SEARCH WORD DB
12d: THESAURUS DB (THESAURUS DATABASE)
20: SHOPPING SERVER
22a: PRODUCT DB
22b: MEMBER DB
30: TERMINAL DEVICE

The invention claimed is:

1. An information processing device, including at east one processor, comprising:
   a pair search word generating unit, within said at least one processor, that in association with user specifying information for specifying a user who uses search words and search time specifying information for specifying search times which are times at which search processing is executed using the search words, generates a pair search word which is obtained by forming a pair of a preceding search word and a subsequent search word in the search times in accordance with an order of the search times, from search words in which intervals between the search times associated with the identical user specifying information are within a predetermined time, with reference to a search word memory unit that stores the search words;
   a first appearance count calculating unit. within said at least one processor, that calculates a first appearance count which is equal to a number of times a specific pair search word appears among pair search words generated by the pair search word generating unit;
   a second appearance count calculating unit, within said at least one processor, that calculates a second appearance count which is equal to a number of times a reverse order pair search word obtained by reversing a search time of the specific pair search word appears; and
   a memory that, when a magnitude relationship between the first appearance count and the second appearance account calculated by the first and second appearance count calculating unit satisfies a predetermined condition, stores the preceding search word and the subsequent search word as a thesaurus.

2. The information processing device according to claim 1, wherein, when a difference between the first appearance count and the second appearance count calculated by the first and second appearance count calculating unit is in a predetermined range, the memory stores the preceding search word and the subsequent search word as the thesaurus.

3. The information processing device according to claim 1, wherein the pair search word generating unit generates the pair search word by processing character strings of the preceding search word and the subsequent search word.

4. The information processing device according to claim 3, wherein the pair search word generating unit generates the pair search word by performing character string processing of deleting a predetermined letter from the previous search and the subsequent search word with reference to a deletion letter memory that stores in advance a letter for deleting the predetermined letter from the search words.

5. The information processing device according to claim 1, wherein, when the number of search words is two or more and there is a common search word between the preceding search word and the subsequent search word, the pair search word generating unit generates the pair search word from the preceding search word and the subsequent search word from which the common search word is deleted.

6. The information processing device according to claim 1, further comprising a search word acquiring unit, within said at least one processor, that acquires a first search word and a second search word with reference to the search word memory,
wherein, when character strings of the first search word and the second search word acquired by the search word acquiring unit are processed, and when an inclusion relationship establishes between the first search word and the second search word the character strings of which are processed, the memory stores the first search word and the second search word as the thesaurus.

7. The information processing device according to claim 6, wherein, when the inclusion relationship is decided by performing character string processing of comparing each letter of the first and second search words in accordance with an order of the character strings of the first search word and the second search word acquired by the search word acquiring unit, and when the inclusion relationship establishes, the memory stores the first search word and the second search word as the thesaurus.

8. The information processing device according to claim 6, wherein, when character string processing of deleting a predetermined letter is performed from the first search word and the second search word acquired by the search word acquiring unit with reference to a deletion letter memory that stores in advance a letter for deleting a predetermined letter from the search word, and when an inclusion relationship establishes between the first search word and the second search word from which the predetermined letter is deleted, the memory stores the first search word and the second search word as the thesaurus.

9. The information processing device according to claim 6, wherein, in case that the number of search words is two or more and there is a common search word between the first search word and the second search word, when an inclusion relationship in case that the predetermined letter is deleted establishes between the first and second search words from which the common search word is deleted, the memory stores as the thesaurus the first and second search words from which the common search word is deleted.

10. The information processing device according to claim 1,
wherein the memory stores two search words as the thesaurus together with a search word comprising a relationship of the thesaurus with at least one of the two search words stored as the thesaurus with reference to a thesaurus database of search words stored as the thesaurus.

11. A method of processing information in an information processing device, including at least one processor, that processes information, the method comprising:
generating, using said at least one processor, in association with user specifying information for specifying a user who uses search words and search time specifying information for specifying search times which are times at which search processing is executed using the search words, a pair search word which is obtained by forming a pair of a preceding search word and a subsequent search word in the search times in accordance with an order of the search times, from search words in which intervals between the search times associated with the identical user specifying information are within a predetermined time, with reference to a search word memory that stores the search words;
calculating, using said at least one processor, a first appearance count which is equal to a number of times a specific pair search word appears among the generated pair search words;
calculating, using said at least one processor, a second appearance count which is equal to a number of times a reverse order pair search word obtained by reversing a search time of the specific pair search word appears; and
storing, using said at least one processor, when a magnitude relationship between -the first appearance count and the second appearance account calculated in the first and second appearance count calculating steps satisfies a predetermined condition, the preceding search word and the subsequent search word as a thesaurus.

12. A recording medium having a non-transitory computer-readable information processing device program recorded thereon that causes a computer to function as:
a pair search word generating unit that, in association with user specifying information for specifying a user who uses search words and search time specifying information for specifying search times which are times at which search processing is executed using the search words, generates a pair search word which is obtained by forming a pair of a preceding search word and a subsequent search word in the search times in accordance with an order of the search times, from search words in which intervals between the search times associated with the identical user specifying information are within a predetermined time, with reference to a search word memory that stores the search words;
a first appearance count calculating unit that calculates a first appearance count which is equal to a number of times a specific pair search word appears among pair search words generated by the pair search word generating unit;
a second appearance count calculating unit that calculates a second appearance count which is equal to a number of times a reverse order pair search word obtained by reversing a search time of the specific pair search word appears; and
a memory that, when a magnitude relationship between the first appearance count and the second appearance account calculated by the first and second appearance count calculating unit satisfies a predetermined condition, stores the preceding search word and the subsequent search word as a thesaurus.

* * * * *